US012678375B2

(12) United States Patent
Radohl et al.

(10) Patent No.: US 12,678,375 B2
(45) Date of Patent: Jul. 14, 2026

(54) PILL CENTERING AND CUTTING APPARATUS

(71) Applicant: SR Holdings & Innovations, LLC, Olathe, KS (US)

(72) Inventors: Tami Radohl, Olathe, KS (US); Matthew Sigley, Olathe, KS (US); Bryan Falk, Chandler, AZ (US)

(73) Assignee: SR Holdings & Innovations, LLC, Olathe, KS (US)

( * ) Notice: Subject to any disclaimer, the term of this patent is extended or adjusted under 35 U.S.C. 154(b) by 216 days.

(21) Appl. No.: 18/532,705

(22) Filed: Dec. 7, 2023

(65) Prior Publication Data

US 2024/0189189 A1 Jun. 13, 2024

Related U.S. Application Data

(60) Provisional application No. 63/386,395, filed on Dec. 7, 2022.

(51) Int. Cl.

| | |
|---|---|
| ***A61J 7/00*** | (2006.01) |
| ***B26D 1/08*** | (2006.01) |
| ***B26D 5/10*** | (2006.01) |
| ***B26D 7/01*** | (2006.01) |

(52) U.S. Cl.

CPC .............. *A61J 7/0007* (2013.01); *B26D 1/08* (2013.01); *B26D 7/01* (2013.01); *B26D 5/10* (2013.01)

(58) Field of Classification Search

CPC ........... A61J 7/0007; A61J 3/00; B26B 17/00; B26B 17/02; B26B 13/22; B26D 3/23; B26D 3/245; B26D 3/30; B26D 5/02; B26D 5/08; B26D 5/083; B26D 5/10; B26D 7/01; B26D 2003/287; B26D 11/00; B26D 11/005; A24F 13/24; A24F 13/26

See application file for complete search history.

(56) References Cited

U.S. PATENT DOCUMENTS

| | | | |
|---|---|---|---|
| 158,205 | A | 12/1874 | Farmer |
| 282,155 | A | 7/1883 | Burns |
| 287,589 | A | 10/1883 | Stevens |
| 294,034 | A | 2/1884 | Hall |
| 555,108 | A | 2/1896 | Morrill |
| 568,242 | A | 9/1896 | Pay |

(Continued)

FOREIGN PATENT DOCUMENTS

| | | | |
|---|---|---|---|
| CN | 202409523 | U | 9/2012 |
| DE | 20303419 | U1 | 4/2003 |

(Continued)

OTHER PUBLICATIONS

Machine translation—Viertel (DE 102019118428).*

(Continued)

*Primary Examiner* — Boyer D Ashley
*Assistant Examiner* — Haleigh N Watson
(74) *Attorney, Agent, or Firm* — Avek IP, LLC

(57) ABSTRACT

A pill positioning and cutting apparatus includes a housing a pair of push buttons slidably mounted within a housing and resiliently coordinated with a pair of pill positioning members slidably positioned in a pill support trough to position a pill in the trough for cutting engagement by converging blades which extend from the push buttons.

18 Claims, 4 Drawing Sheets

(56) References Cited

U.S. PATENT DOCUMENTS

| | | | | |
|---|---|---|---|---|
| 854,433 | A | 5/1907 | Rowan | |
| 987,786 | A | 3/1911 | Adell et al. | |
| 1,641,077 | A | 8/1927 | Fouquet | |
| 3,461,555 | A | 8/1969 | Bliznak | |
| 4,199,863 | A | 4/1980 | Deckert | |
| 4,229,881 | A | 10/1980 | Troxel | |
| 4,815,210 | A | 3/1989 | Burrage | |
| 5,157,996 | A | 10/1992 | Keyvani | |
| 6,164,286 | A * | 12/2000 | Schad | A24F 13/26 30/109 |
| 6,752,053 | B2 | 6/2004 | Rubicam | |
| 7,673,778 | B2 | 3/2010 | Sze et al. | |
| 8,430,287 | B2 | 4/2013 | Sze | |
| 8,474,674 | B2 | 7/2013 | Sze | |
| 8,656,595 | B2 * | 2/2014 | Wong | A24F 13/26 30/109 |
| 8,925,434 | B2 | 1/2015 | Omura et al. | |
| 9,314,405 | B2 | 4/2016 | Smith | |
| 9,849,068 | B2 * | 12/2017 | Martin | B26F 3/00 |
| 10,736,353 | B1 * | 8/2020 | Sharp | A24F 13/26 |
| D933,847 | S | 10/2021 | Triplett | |
| 11,672,735 | B2 | 6/2023 | Triplett | |
| 2008/0113367 | A1 | 5/2008 | Becker et al. | |
| 2017/0231271 | A1 * | 8/2017 | Almsberger | A24F 13/26 30/113 |
| 2017/0273868 | A1 * | 9/2017 | Wang | B26D 5/10 |
| 2021/0220223 | A1 * | 7/2021 | Triplett | A61J 7/0007 |

FOREIGN PATENT DOCUMENTS

| | | | | |
|---|---|---|---|---|
| DE | 102019118428 | A1 * | 1/2021 | A61J 7/0007 |
| KR | 20110099090 | A | 9/2011 | |

OTHER PUBLICATIONS

BonsaiMary.com; Concave Branch Cutter the First Real Bonsai Tool to Purchase, retrieved at https://www.bonsaimary.com/concave-branch-cutter.html, Apr. 26, 2019, Copyright 2008-2019.

EDMGB, Bonsai 8" Concave Branch Cutter Pruner Japanese Gardener Tool, retrieved at https://www.amazon.com/Bonsai-Concave-Branch-Japanese-Gardener/dp/B00JLRKPC6, Apr. 26, 2019.

KME, Stainless Steel Top Nose Cutter Plier, Singapore Wholesale, retrieved at http://koiming.com/en/tools-and-adhesives/916-stainless-steel-top-nose-cutter-plier.html, Apr. 26, 2019.

Rubberized Steel Cigar Scissors-Cigars Intl, retrieved at https://www.cigarsinternational.com/p/rubberized-steel-cigar-scissors-cutters/1514528/, Apr. 26, 2019, Copyright 1996-2019.

* cited by examiner

PILL CENTERING AND CUTTING APPARATUS

CROSS-REFERENCE TO RELATED APPLICATIONS

This application claims the benefit of priority of U.S. Provisional Patent Application No. 63/386,395, filed on Dec. 7, 2022, the disclosure of which is herein incorporated by reference in its entirety.

BACKGROUND

1. Field

The present invention relates to tablet or pill cutter apparatus and, more particularly, to such apparatus which urges a pill to a cutting position for cutting in half by a pair of opposed blades.

2. Related Art

When physicians make adjustments in prescriptions of their patients, they sometimes prescribe a dose which is halfway between standard incremental doses stocked by pharmacies and apothecaries. The patient may use a "pill cutter" to cut a single pill or tablet in half to get the dose prescribed. As used herein, the term "pill" refers to a tablet which is a solid dosage unit of an active medication along with one or more inactive ingredients, usually in powder form, which are pressed or compacted to form the solid dose. It is not usually practical to divide capsule forms of medications.

There are many mechanisms available for cutting pills in half. In a typical type of pill cutter commonly available, the cutter is formed of a lower jaw having an upper jaw pivotally connected thereto. The pill is positioned on a support surface of the lower jaw, and a blade secured to the upper jaw is pivoted into contact with the pill. This action often causes the pill to be divided in an uneven manner with fragments broken from the halves. A pill cutter including a pair of opposed, curved blades is described in U.S. Pat. No. 10,772,802, the disclosure of which is incorporated herein in its entirety by reference. In the referenced patent, the curved blades are disclosed to provide a more uniform and less fragmented cutting of a pill.

SUMMARY

The present invention provides embodiments of a pill cutting apparatus including: a pill cutter housing having a pill support trough formed therein by a trough wall having a blade clearing slot formed therethrough; first and second blade support members slidably supported on the housing in opposed linear relation, each blade support member having a respective pill cutter blade secured to an inner end and having a respective outer end extending externally from the housing; the blade support members being resiliently urged away from respective converged, pill cutting positions and being retained by the housing in released positions thereof; and the blade support members being positioned to extend the respective blades through the blade clearing slot to the converged positions thereof to thereby cut a pill supported in the pill support trough.

An embodiment of the pill cutting apparatus includes a pill positioning mechanism supported within the housing, the pill positioning mechanism being engaged with the blade support members and having a pair of opposed pill positioning members extending into the pill support trough whereby movement of the blade support members toward the converged positions causes coordinated converging movement of the pill positioning members toward the blade clearing slot to thereby position a pill for engagement by the blades in the converged position thereof.

An embodiment of the pill cutting apparatus includes a rack and pinion mechanism engaged between the blade support members and the pill positioning mechanism which is configured to transfer movement of the blade support members to the pill positioning mechanism to thereby cause coordinated movement thereof with movement of the blade support members. The rack and pinion mechanism may be resiliently engaged between the blade support members and the pill positioning mechanism to thereby prevent damage to a pill engaged by the pill positioning members.

In an embodiment of the pill cutting apparatus, the rack and pinion mechanism includes a blade pinion gear rotatably engaging the housing; a pair of blade rack members extending respectively from the blade support members, the blade rack members meshing with the blade pinion gear on diametrically opposite sides thereof; a pill positioning pinion gear rotatably engaging the housing in axial alignment with the blade pinion gear; a pair of pill positioning rack members extending respectively from the pill positioning members, the pill positioning rack members meshing with the pill positioning pinion gear on diametrically opposite sides thereof; and the pill positioning pinion gear engaging the blade pinion gear to thereby transfer movement of the blade support members through the rack and pinion mechanism to the pill positioning members. The pill positioning pinion gear may be resiliently engaged with the blade pinion gear to thereby prevent damage to a pill engaged by the pill positioning members.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION

Figure 2:
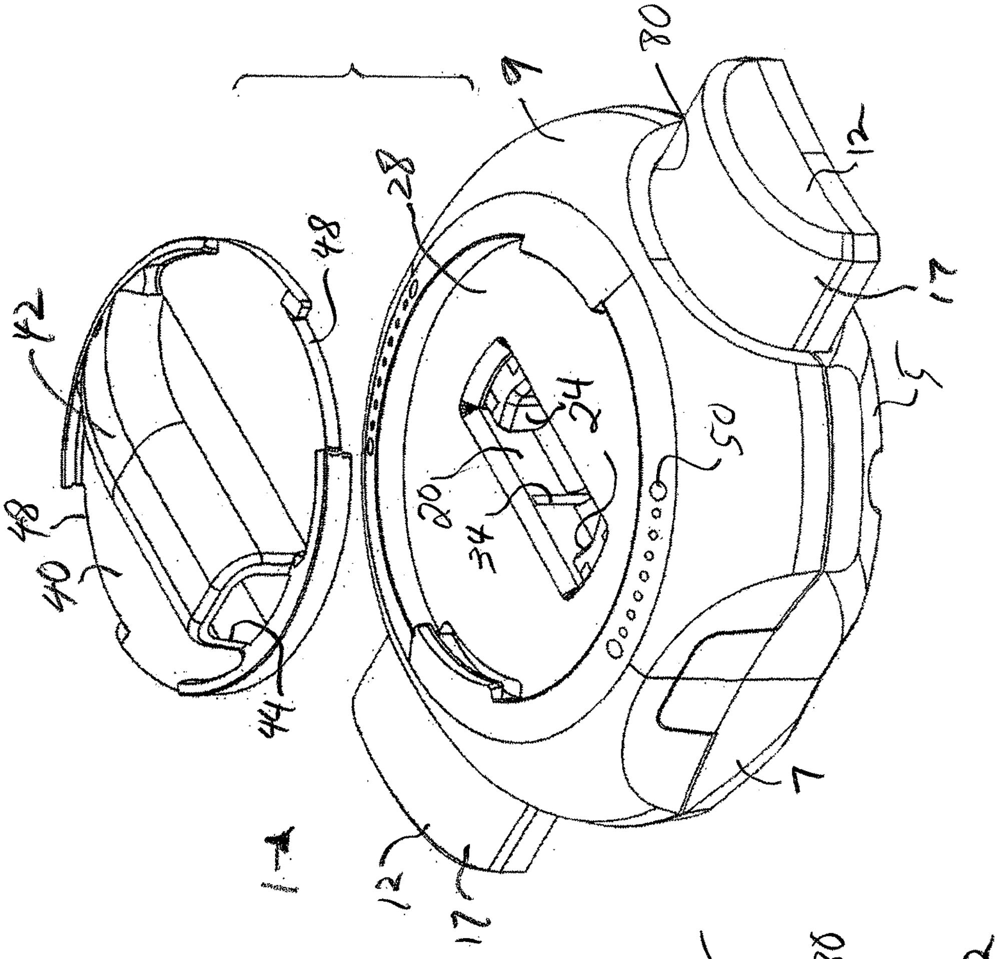
FIG. 2 is an enlarged perspective view of the apparatus with a funnel-cap removed to illustrate a pill support trough thereof.
Figure 1:
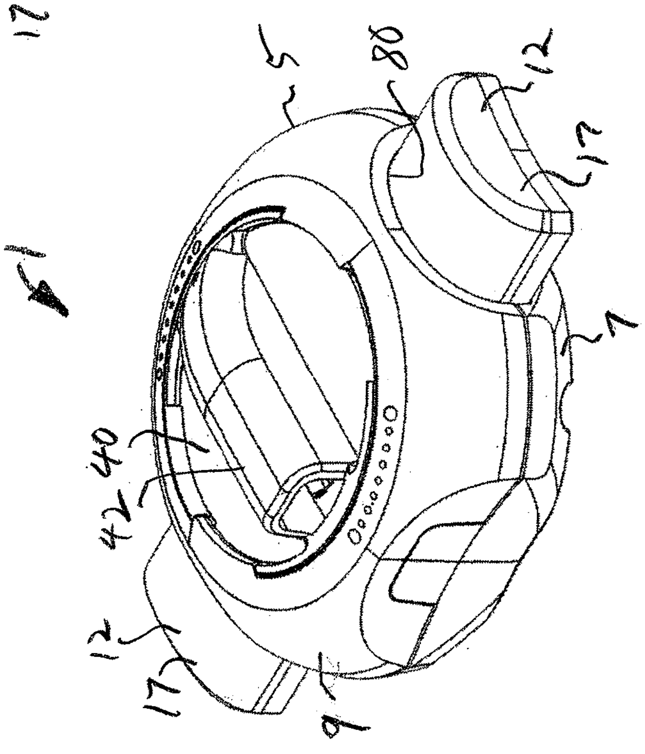
FIG. 1 is a perspective view of a pill centering and cutting apparatus according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure Referring to the drawings in more detail, embodiments include a pill centering and cutting apparatus 1, or more specifically, a pill cutter apparatus. In general, apparatus 1 includes a housing assembly 5 formed by a lower housing component or lower housing 7 and an upper housing component or upper housing 9. The housing assembly 5 has a pair of blade support members 12 slidably mounted therein in opposed linear relationship. Each of the blade support members has a respective pill cutter blade 15 (FIGS. 3 and 7) extending from an inward end thereof and a push button structure or push button 17 at an outward end thereof. The upper housing 9 has a pill support trough 20 formed therein and has a pair of pill positioning members or pill pistons 24 slidably positioned in the trough 20 in opposed linear relation. Trough 20, in embodiments, helps center a received pill depending on size. A smaller pill may need trough 20 to direct the pill towards the center of the channel to be better positioned for the lateral centering tabs (opposing an object for cutting and existing at the end of pistons 24) and the blades 15. The trough shape is helpful in that smaller pills may otherwise have too much freedom of movement which can adversely affect the centering action of the lateral centering tabs and may not allow for the even contact of the dual blades.

The pistons 24 are engaged with the blade support members 12 in such a manner as to position or center a pill placed in the trough 20 for engagement by the blades 15 when the push buttons 17 are manually pushed toward one another into the housing assembly 5.

Figure 4:
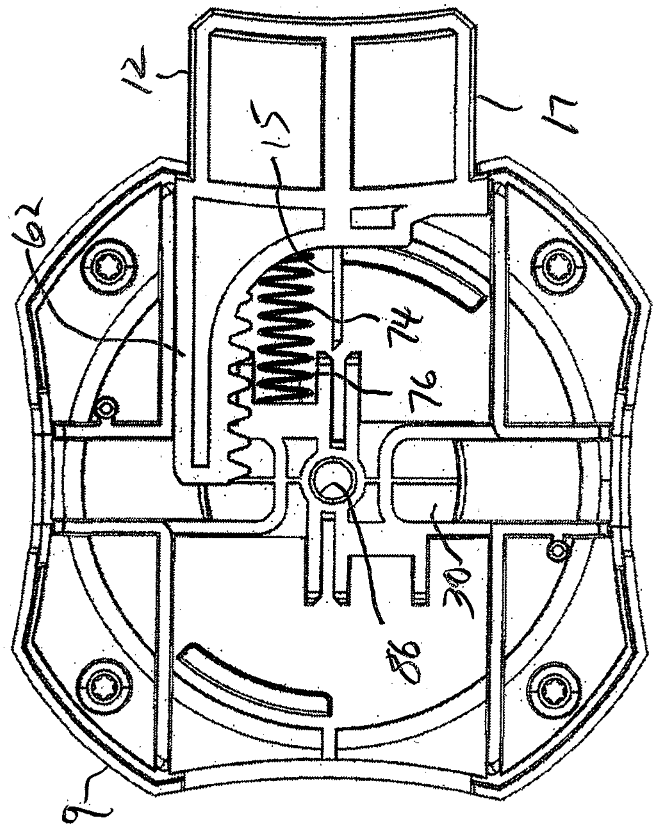
FIG. 4 is a fragmentary bottom plan view illustrating a blade support member and return spring engaged with an upper housing of the apparatus.

The illustrated upper housing 9 has an inset surface forming a circular cap receiving recess or cap recess 28. The illustrated trough 20 is elongated and is formed by a trough wall 30 (FIGS. 4 and 7) inset into cap recess 28. The pistons 24 extend into the trough in opposed relation and have pill-engaging faces which are downwardly sloped and angle outwardly. The pill-engaging downwardly sloped and downward and outwardly angled faces on each of opposing pistons 24 help to center the pill by engaging the outside top edges at each end of the pill. This holds each end of the pill down in the trough 20 from the top, while the trough 20 supports the pill from the bottom.

The trough wall 20 has a pair of blade clearing slots or blade slots 34 formed through the sides thereof which are aligned respectively with the blades 15. One of the blade slots 34 is shown in FIG. 2. The illustrated trough wall 30 is elongated and has a lower component which is substantially cylindrical in shape which tends to align an elongated pill there-along such that the blades 15 cut across such a pill rather than along the pill.

The upper housing 9 receives a cap or "funnel-cap" 40 in the cap recess 28 to close the housing 5. The illustrated cap 40 has a raised wall forming a diametrically extending funnel structure or funnel 42 having a funnel opening 44 at one end thereof. The illustrated cap 40 is retained in the cap recess 28 by a pair of bayonet lugs 46 which engage compatible bayonet notches 48 formed in the cap 40. The notches 48 are aligned with the lugs 46 to place the cap 40 in the recess 28, and the funnel 42 may be used as a handle to rotate the cap 40 to engage it with the lugs 46. A pill to be cut may be inserted into the trough 20 through the opening 44. After the pill is cut, the pill halves can be retrieved by inverting the apparatus 1 and using the funnel 42 to guide the pill halves out through the opening 44. Preferably, cap 40 is formed of a transparent material to enable the user to observe a pill and pill halves within the trough 20. Cap 40 may be removed to facilitate clearing pill fragments from the trough 20. The upper housing 9 surrounding the cap recess 28 may be provided with a cap direction pattern 50 which is aligned with the funnel 42, or by other means, to inform the user of the direction to rotate the cap 40 to thereby remove and replace the cap 40.

Figure 3:
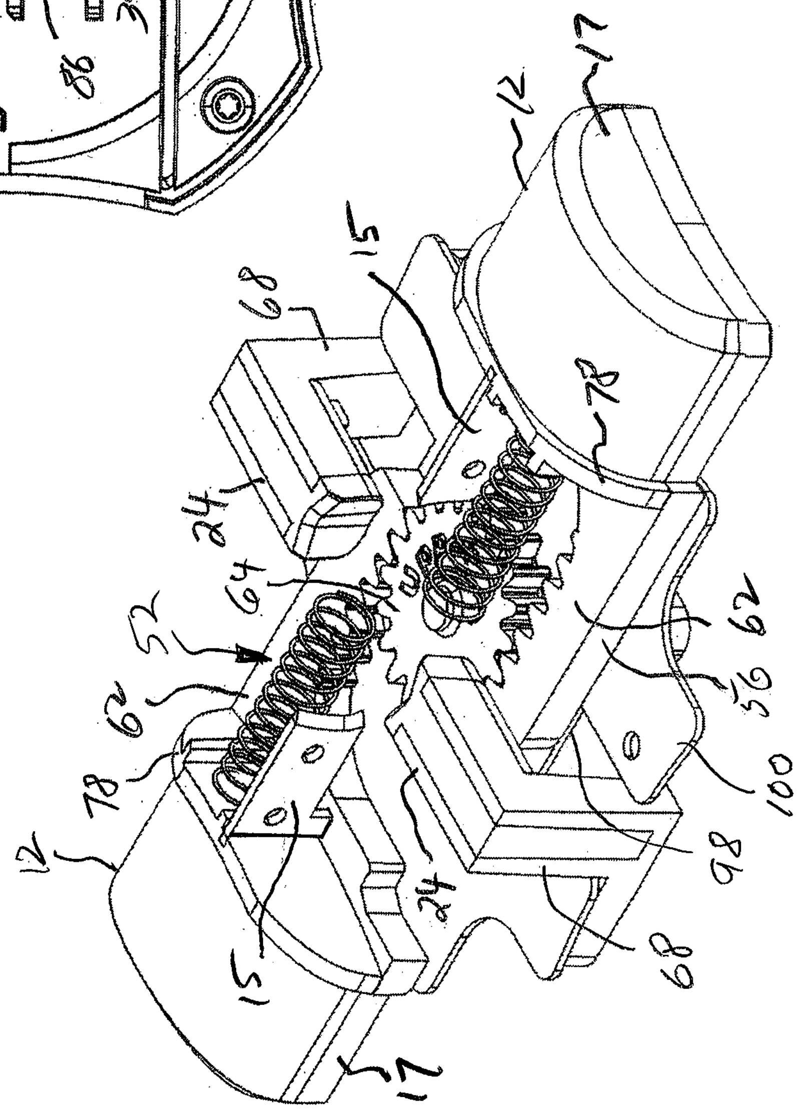
FIG. 3 is a further enlarged fragmentary perspective view of a rack and pinion mechanism engaged between blade support members and pill positioning members of the apparatus.
Figure 5:
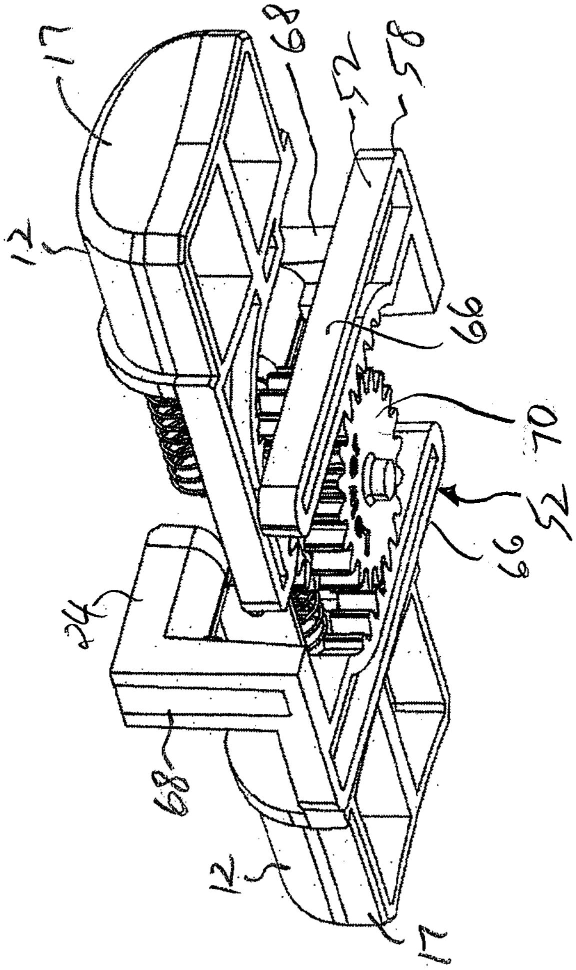
FIG. 5 is a fragmentary perspective view of the rack and pinion mechanism of the apparatus from an angle below the mechanism.

Referring to FIGS. 3 and 5, in the illustrated embodiment of the apparatus 1, the pill pistons 24 are engaged with the blade support members 12 by means of a double rack and pinion mechanism 52 including a blade rack and pinion mechanism 56 and a piston rack and pinion mechanism 58. The blade rack and pinion mechanism 56 (FIG. 3) includes blade rack members 62 which extend inwardly from the push buttons 17 of the blade support members 12 and mesh with a blade pinion gear 64 on diametrically opposite sides thereof. The piston rack and pinion mechanism 58 (FIG. 5) includes piston rack members 66 extending from L-shaped brackets 68 connected to the pistons 24 and meshing with a piston pinion gear 70 on diametrically opposite sides thereof. The blade pinion 64 is rotatable relative to and is received on piston pinion 70 in such a manner that inward movement of the push buttons 17 causes the pistons 24 to converge to position or center a pill within the trough 20 for cutting engagement by the blades 15 as they enter the trough 20 through the slots 34.

The illustrated push buttons 17 are resiliently urged outwardly by push button counter biasing return springs 74 engaged respectively between the push buttons 17 and spring abutment surfaces 76 (FIG. 4) formed within the upper housing 9. The push buttons 17 are retained within the upper housing 9 by button retainer ridges 78 formed thereon which engage surfaces forming openings 80 the upper housing 9 through which the push buttons 17 extend. Outward linear movement of the push buttons 17, when released, is transferred through the double rack and pinion mechanism 52 to the piston 24, causing the pistons to retract within the trough 20. The housing 5 with the push buttons 17 extending therefrom are sized to fit comfortably in an adult hand of an average size for manual operation. Alternatively, the housing could be provided in other sizes to accommodate users having large or small hands or to more efficiently accept varying pill sizes.

Figure 6:
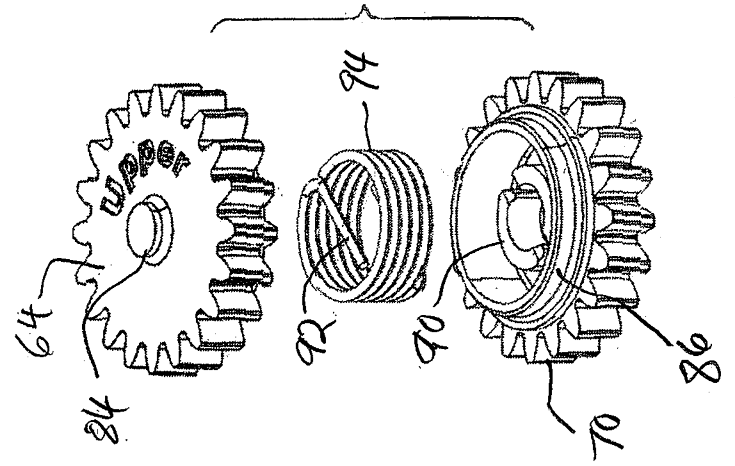
FIG. 6 is a fragmentary exploded perspective view of a blade pinion gear, a pill positioning pinion gear, and a torsion spring of the rack and pinion mechanism of the apparatus.

In the illustrated apparatus 1, the blade rack and pinion mechanism 56 is resiliently engaged with the piston rack and pinion mechanism 58 to reduce the likelihood of damage to a pill within the trough 20 by the pistons 24. Referring to FIG. 6, the blade pinion 64 and the piston pinion 70 are mounted for independent, coaxial rotation within the housing 5. The pinions 64 and 70 have outer stub shafts 84 extending axially therefrom for reception in respective bearing cylinders 86 (FIG. 4) formed centrally on inner sides of the upper and lower housings 7 and 9. On inner sides thereof, the pinions 64 and 70 have nesting bearing collars 86. Finally, the pinions 64 and 70 have slotted spring collars 90 which seat end extensions 92 of a torsion spring 94. A torsion spring having internal leg extensions like torsion spring 94 is commonly referred to as a radial over center torsion spring and is of the variety where the leg extensions are bent inward towards and through a center axis of the spring. Thus, the pinions 64 and 70 are resiliently engaged and, thereby, enable the piston rack and pinion mechanism 58 to be resiliently engaged with the blade rack and pinion mechanism 56.

More specifically, when the pushbuttons 17 are pushed in, both directly and rigidly push the blades 15 toward one another. Occurring simultaneously, the teeth of rack 62 cause rotation of the upper pinion 64. The lower pinion 70 tends to follow the rotation of the upper pinion 64, but not rigidly, but resiliently. When an engagement of a pill stops the progress of the plungers 24, this back force overcomes the resistive force of the torsion spring 94. This causes the rotation of the lower pinion 70 to stop, and not follow the still rotating upper pinion 64 which continues to rotate until a pill cut is made.

Figure 7:
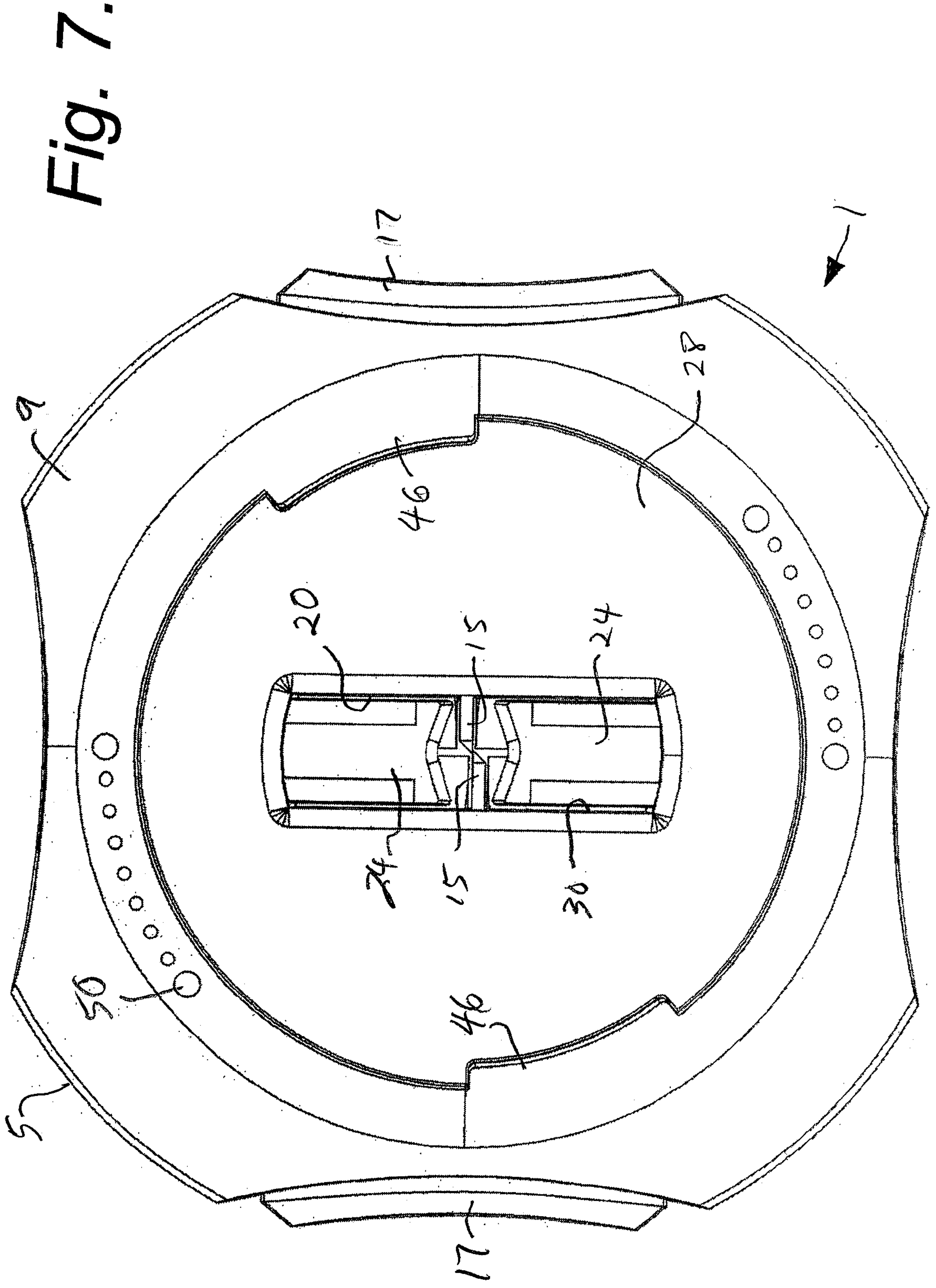
FIG. 7 is a greatly enlarged top plan view of the apparatus with the funnel-cap removed and illustrating the pill cutting blades and pill positioning members of the apparatus in converged positions thereof.

As a result of the torsion-spring biased arrangement above, the pill is securely held at the start of the cutting action, and then blades project out of the slots 34 to execute the cut once the pill is secured. The torsion spring also creates increased resistance to the motion of the cutting blades moving perpendicularly through the plane of the pill making for a cleaner cut. The torsion spring flexes to not only maintain forceful engagement of the pill, but also allows for termination of the inward movement of the pistons 24 while allowing the blades to continue to converge towards and into the exterior surfaces of the pill to make a cut. Additionally, converging movement of the pistons 24 is limited by engagement of the L-shaped brackets 68 with notches 98 formed in a separation plate 100 extending between the blade rack and pinion mechanism 56 and the piston rack and pinion mechanism 58. The separation plate 100 also provides support for components of the rack and pinion mechanisms 56 and 58 and retains them in their proper function position ranges. FIG. 7 shows the apparatus 1 with the push buttons 17 in their maximum inward positions which causes the blades 15 to converge through the trough 20 and causes the pistons 24 to be in their maximally converged positions within the trough 20.

It is to be understood that while certain forms of the present invention have been described and illustrated herein, it is not to be limited to the specific forms or arrangement of parts described and shown.

The invention claimed is:

1. A pill cutting apparatus comprising:
a pill cutter housing having a pill support trough formed therein by a trough wall having a blade clearing slot formed therethrough;
first and second blade support members slidably supported on the housing in opposed relation, each blade support member having a respective pill cutter blade secured to an inner end and having a respective outer end extending externally from the housing;
a pill positioning mechanism supported within the housing, the pill positioning mechanism being engaged with the blade support members and having a pair of opposed pill positioning members extending into the pill support trough whereby movement of the blade support members toward the converged positions causes coordinated converging movement of the pill positioning members toward the blade clearing slot to thereby position a pill for engagement by the blades in the converged position thereof;
the blade support members being resiliently urged away from respective converged, pill cutting positions and being retained by the housing in released positions thereof, and
the blade support members being positioned to extend the respective blades through the blade clearing slot to the converged positions thereof to thereby cut a pill supported in the pill support trough.

2. An apparatus as set forth in claim 1 and including:
a rack and pinion mechanism engaged between the blade support members and the pill positioning mechanism which is configured to transfer movement of the blade support members to the pill positioning mechanism to thereby cause coordinated movement thereof with movement of the blade support members.

3. An apparatus as set forth in claim 2 wherein:
the rack and pinion mechanism is resiliently engaged between the blade support members and the pill positioning mechanism to thereby prevent damage to a pill engaged by the pill positioning members.

4. An apparatus as set forth in claim 2 wherein the rack and pinion mechanism includes:
a blade pinion gear rotatably engaging the housing;
a pair of blade rack members extending respectively from the blade support members, the blade rack members meshing with the blade pinion gear on diametrically opposite sides thereof;
a pill positioning pinion gear rotatably engaging the housing in axial alignment with the blade pinion gear;
a pair of pill positioning rack members extending respectively from the pill positioning members, the pill positioning rack members meshing with the pill positioning pinion gear on diametrically opposite sides thereof; and
the pill positioning pinion gear engaging the blade pinion gear to thereby transfer movement of the blade support members through the rack and pinion mechanism to the pill positioning members.

5. An apparatus as set forth in claim 4 wherein:
a torsion spring between the pill positioning pinion gear and the blade pinion gear is configured to cause the pill positioning gear to resiliently follow the blade pinion gear and thereby allow for continued rotation of the pill positioning pinion gear upon a back force presented when a pill is engaged by the pill positioning members.

6. A pill cutting apparatus comprising:
a pill cutter housing having a pill support trough formed therein by a trough wall having a blade clearing slot formed therethrough;
first and second blade support members slidably supported on the housing in opposed linear relation, each blade support member having a respective pill cutter blade secured to an inner end and having a respective outer end extending externally from the housing;
the blade support members being resiliently urged away from respective converged, pill cutting positions and being retained by the housing in released positions thereof;
a pill positioning mechanism supported within the housing, the pill positioning mechanism being engaged with the blade support members and having a pair of opposed pill positioning members extending into the pill support trough whereby movement of the blade support members toward the converged positions causes coordinated converging movement of the pill positioning members toward the blade clearing slot to thereby position a pill for engagement by the blades in the converged position thereof; and the blade support members being positioned to extend the respective blades through the blade clearing slot to the converged positions thereof to thereby cut a pill positioned in the pill support trough.

7. An apparatus as set forth in claim 6 and including:

a rack and pinion mechanism engaged between the blade support members and the pill positioning mechanism which is configured to transfer movement of the blade support members to the pill positioning mechanism to thereby cause coordinated movement thereof with movement of the blade support members.

8. An apparatus as set forth in claim 7 wherein:

the rack and pinion mechanism is resiliently engaged between the blade support members and the pill positioning mechanism to thereby prevent damage to a pill engaged by the pill positioning members.

9. An apparatus as set forth in claim 7 wherein the rack and pinion mechanism includes:

a blade pinion gear rotatably engaging the housing;

a pair of blade rack members extending respectively from the blade support members, the blade rack members meshing with the blade pinion gear on diametrically opposite sides thereof;

a pill positioning pinion gear rotatably engaging the housing in axial alignment with the blade pinion gear;

a pair of pill positioning rack members extending respectively from the pill positioning members, the pill positioning rack members meshing with the pill positioning pinion gear on diametrically opposite sides thereof; and the pill positioning pinion gear engaging the blade pinion gear to thereby transfer movement of the blade support members through the rack and pinion mechanism to the pill positioning members.

10. An apparatus as set forth in claim 9 wherein:

the pill positioning pinion gear is resiliently engaged with the blade pinion gear to thereby prevent damage to a pill engaged by the pill positioning members.

11. A pill cutting device comprising:

a housing having a pill receiving area;

a first blade support member supporting a first inwardly directed blade and a second blade support member supporting a second inwardly directed blade, the first blade support member being slidably supported in an opposed linear relation in the housing relative to the second blade support member and a user actuation system enabling the first blade support member being compelled toward the second blade support member;

the first and second blade support members being urged away from the pill receiving area and resisting an actuation force applied by a user by one or more counter-biasing members;

a pill positioning mechanism supported within the housing;

the pill positioning mechanism being engaged with the blade support members and having a first opposed pill positioning member and a second pill positioning member;

the first and second pill positioning members extending into the pill receiving area whereby inward movement of the first and second blade support members causes resilient converging movement of the pill positioning members toward the pill receiving area to position a pill for a cut by the first and second inwardly directed blades.

12. The device of claim 11 comprising:

a following arrangement causing the first and second pill positioning members, upon an engagement by the user actuation system, to approach and resiliently engage a pill.

13. The device of claim 12 comprising:

one or more sets of teeth on the direct blade-driving arrangement, the one or more sets of teeth being received by a first pinion rotatable within the device, the first pinion being coaxial with and rotatable relative to a second pinion which is rotatable within the device;

a torsion spring included between the first and second pinions, the torsion spring causing the second pinion, upon receiving rotation of the first pinion, to resiliently follow the first pinion;

one or more second sets of teeth on the pill positioning members, the one or more second sets of teeth being driven by rotation of the second pinion to cause convergence towards the pill receiving area.

14. The device of claim 13 wherein the torsion spring is included inside the first and second pinions and has inwardly bent end extensions secured into slotted spring collars formed on the inside surfaces of each of the first and second pinions.

15. The device of claim 13 wherein the torsion spring is an over center torsion spring.

16. The device of claim 11 wherein the first and second blade support members converge in a direction which is transverse to a direction of convergence executed by the pill positioning members.

17. The device of claim 16 wherein:

the pill-receiving area includes a trough; and the first and second pill positioning members are configured to initially engage upper surfaces at each end of a pill prior thus pushing the pill down and centering the pill into the trough prior to a cut made by the first and second inwardly directed blades.

18. The device of claim 11 comprising:

a removable pill directing cap, the pill directing cap, when installed, configured to receive a pill to be cut into the pill receiving area;

the cap further being configured to allow for a first and a second pieces created after a cut to be retrieved by inverting the device.

* * * * *